United States Patent
Sheppard et al.

(10) Patent No.: US 10,825,030 B2
(45) Date of Patent: *Nov. 3, 2020

(54) METHODS AND APPARATUS TO DETERMINE WEIGHTS FOR PANELISTS IN LARGE SCALE PROBLEMS

(71) Applicant: The Nielsen Company (US), LLC, New York, NY (US)

(72) Inventors: Michael Sheppard, Brooklyn, NY (US); Jonathan Sullivan, Hurricane, UT (US); Peter Lipa, Tuscon, AZ (US); Alejandro Terrazas, Santa Cruz, CA (US); Matt Reid, Alameda, CA (US); Paul Donato, New York, NY (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/459,261

(22) Filed: Jul. 1, 2019

(65) Prior Publication Data
US 2019/0325457 A1 Oct. 24, 2019

Related U.S. Application Data

(63) Continuation of application No. 14/865,639, filed on Sep. 25, 2015, now Pat. No. 10,339,543.

(51) Int. Cl.
*G06Q 30/02* (2012.01)
*G06Q 10/00* (2012.01)

(52) U.S. Cl.
CPC ............ *G06Q 30/02* (2013.01); *G06Q 10/00* (2013.01)

(58) Field of Classification Search
CPC ... G06Q 40/06; G06Q 30/0631; G06N 99/005
See application file for complete search history.

(56) References Cited

U.S. PATENT DOCUMENTS 8,341,009 B1   12/2012   Algranati
8,346,593 B2   1/2013    Fanelli et al.
(Continued)

OTHER PUBLICATIONS

Kruth, "Interior-Point Algorithms for Quadratic Programming," Technical University of Denmark, Informatics and Mathematical Modelling, Kogens Lyngby, Denmark, Feb. 2008, 123 pages.
(Continued)

*Primary Examiner* — Kamran Afshar
*Assistant Examiner* — Ying Yu Chen
(74) *Attorney, Agent, or Firm* — Hanley, Flight & Zimmerman, LLC

(57) ABSTRACT

Methods and apparatus to solve for a minimum variance solution for a constrained weight problem in a scalable and memory efficient manner are disclosed. An example method includes storing a constraint matrix and a population matrix into a memory, the constraint matrix representing demographics associated with a plurality of panelists in a population, the population matrix representing second demographics of the population; determining, by executing an instruction with a processor, a linear system based on a set of constraints including the constraint matrix and the population matrix; determining, by executing an instruction with the processor, a solution to the linear system by determining an inverse of a first matrix of the linear system, the determination of the inverse including breaking down the first matrix into blocks, dimensions of the blocks being no larger than dimensions of the constraint matrix and outputting a set of weights based on the inverse of the linear system, the set of weights satisfying the set of constraints.

20 Claims, 9 Drawing Sheets

(56) References Cited

U.S. PATENT DOCUMENTS

| | | |
|---|---|---|
| 8,694,359 B2 | 4/2014 | Algranati |
| 9,047,585 B2 | 6/2015 | Bruce et al. |
| 2003/0130887 A1 | 7/2003 | Nathaniel |
| 2008/0263088 A1 | 10/2008 | Webster et al. |
| 2009/0099976 A1 | 4/2009 | Kawamoto et al. |
| 2009/0187520 A1 | 7/2009 | Liu et al. |
| 2011/0004682 A1 | 1/2011 | Honnold et al. |
| 2014/0278472 A1 | 9/2014 | Guetz |

OTHER PUBLICATIONS

United States Patent and Trademark Office, "Non-Final Office Action," issued in connection with U.S. Appl. No. 14/865,639, dated Jul. 26, 2018, 28 pages. (Copy not provided as this is a USPTO document. Will provide Upon request by Examiner.).

Sukhorukova, "An interior point method and Sherman-Morrison formula for solving large scale convex quadratic problems with diagonal Hessians," ResearchGate, Anziam J. 56 (E), pp. E1-E21, Jan. 25, 2015, 22 pages.

Bar-Gera et al., "Estimating Survey Weights with Multiple Constraints Using Entropy Optimization Methods," Nov. 2008, 33 pages.

United States Patent and Trademark Office, "Notice pf Allowance and Fee(s) Due," issued in connection with U.S. Appl. No. 14/865,639, dated Feb. 8, 2019, 20 pages. (Copy not provided as this is a USPTO document. Will provide upon request by Examiner.).

$$A = \begin{bmatrix} 1 & 1 & 1 & 1 & 1 & 1 & 0 & 0 & 0 & 0 & 0 & 0 \\ 0 & 0 & 0 & 0 & 0 & 0 & 1 & 1 & 1 & 1 & 1 & 1 \\ 1 & 1 & 0 & 0 & 0 & 0 & 1 & 1 & 0 & 0 & 0 & 0 \\ 0 & 0 & 1 & 1 & 0 & 0 & 0 & 0 & 1 & 1 & 0 & 0 \\ 0 & 0 & 0 & 0 & 1 & 1 & 0 & 0 & 0 & 0 & 1 & 1 \\ 1 & 0 & 1 & 0 & 1 & 0 & 1 & 0 & 1 & 0 & 1 & 0 \\ 0 & 1 & 0 & 1 & 0 & 1 & 0 & 1 & 0 & 1 & 0 & 1 \end{bmatrix}$$

← 402
← 404
← 406
← 408
← 410
← 412
← 414

US 10,825,030 B2

METHODS AND APPARATUS TO DETERMINE WEIGHTS FOR PANELISTS IN LARGE SCALE PROBLEMS

RELATED APPLICATION

This patent arises from a continuation of U.S. patent application Ser. No. 14/865,639, which was filed on Sep. 25, 2015. U.S. patent application Ser. No. 14/865,639 is hereby incorporated herein by reference in its entirety. Priority to U.S. patent application Ser. No. 14/865,639 is hereby claimed.

FIELD OF THE DISCLOSURE

This disclosure related generally to audience measurement and, more particularly, to methods and apparatus to determine weights for panelists in large scale problems.

BACKGROUND

Content providers and advertisers hire panelist to yield a representative sample of a desired demographic group of a population of users. Calibrating the representative sample is a technique used to improve estimates and reduce cost of having to construct a larger sample to achieve the same accuracy. Conventional calibration involves finding weights for the representative sample that match the population constraints while attempting to minimize variance (e.g., increasing the precision) of the sample. However, as the number of constraints increases, conventional calibration techniques require more memory than is available on a computer. Therefore, conventional calibration techniques are not scalable for medium-to-large scale problems.

BRIEF DESCRIPTION OF THE DRAWINGS

The figures are not to scale. Wherever possible, the same reference numbers will be used throughout the drawing(s) and accompanying written description to refer to the same or like parts

DETAILED DESCRIPTION

Figure 1:
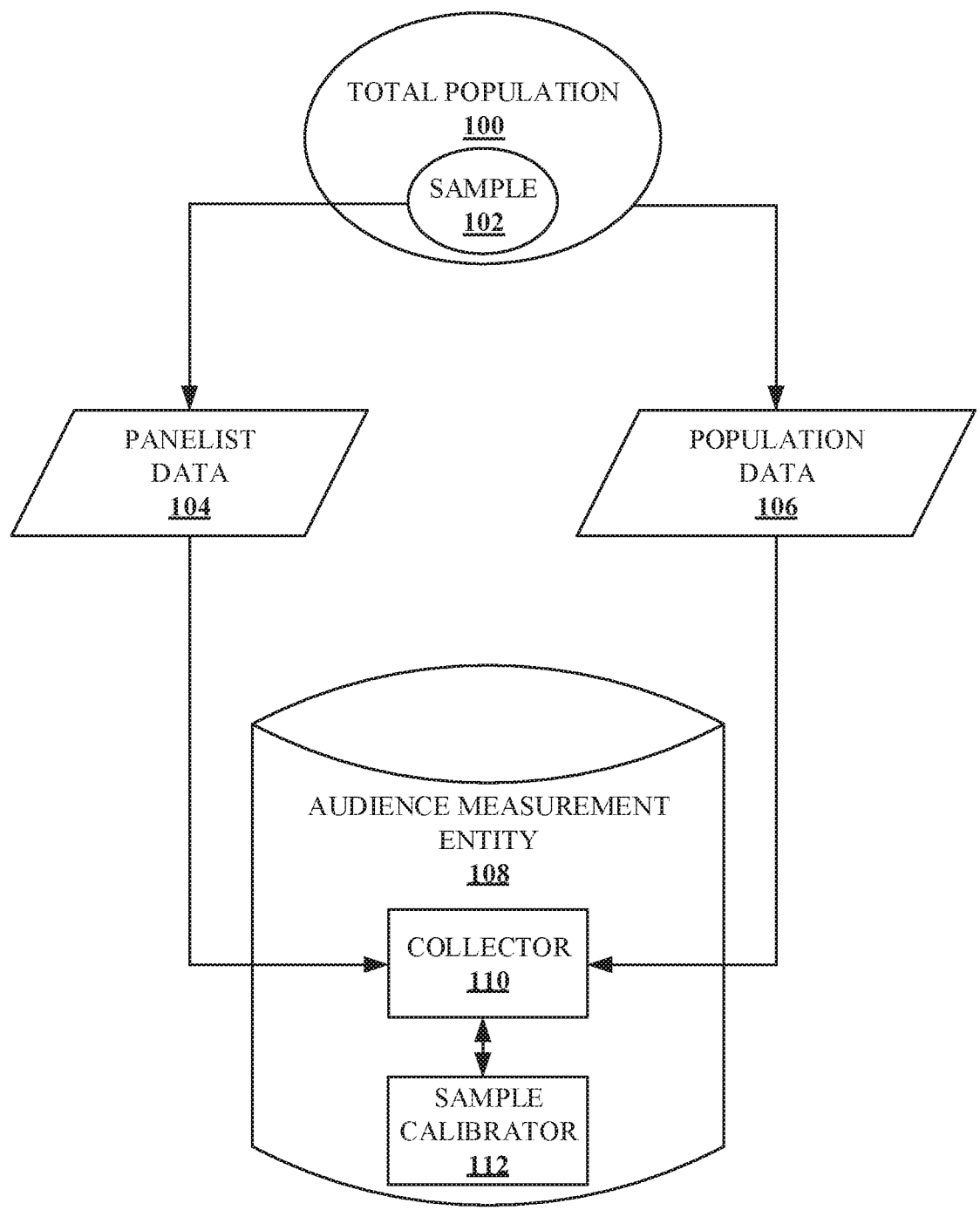
FIG. 1 is a block diagram of an example environment in which an example audience measurement entity obtains panelist data and population data from an example population.

Determining the size and specific demographics of a media viewing audience helps media content providers and distributors schedule media programming and determine a price for advertising during the programming. In addition, accurate estimates of media viewing demographics enable advertisers to target certain types and sizes of audiences. To collect these demographics, an audience measurement company enlists a plurality of media viewers (e.g., panelists) to cooperate in an audience measurement study (e.g., a panel) for a predefined length of time. The viewing habits and demographic data associated with the panelists are collected and used to statistically represent the total media viewing audience (e.g., a population). In some examples, weights are applied to each panelist such that the demographics of the weighted panelists match the demographics of the total population. However, there are many different solutions to match panelist data to population data. An optimal solution may be any solution that optimizes any selected criteria to determine a unique solution. In some examples, an optimal solution may be a unique solution that minimizes the sum of squares, sum of values, etc. In some examples a unique solution may not exist. Examples disclosed herein determine a unique solution that optimizes minimum variance (e.g. maximizing effective sampling size) based on a set of auxiliary constraints (e.g., weights satisfying the population, weights being non-negative, weights satisfying preset boundaries, etc.).

Data determined for a sample population of panelists may have demographic statistics corresponding to demographic statistics of a target population to which the data is to be applied. For example some rating campaigns (e.g., such as audience measurement campaigns, market research campaigns, etc.) divide a sample population into several different demographic categories (e.g., such as categories based on gender, age, income, location, mobile phone usage, etc.) and an individual in the population may belong to multiple of theses demographic categories. A given ratings campaign may then involve determining viewing data (e.g., media exposure viewing data and/or other audience measurement data, market research ratings data, etc.) for individual demographic categories or combination of such demographic categories for a sample population, and applying the viewing data to different (e.g., larger) target population. However, in order to accurately represent the target population weights are determined and applied to each individual in the sample population to satisfy all auxiliary constraints.

Some conventional techniques to determine unique solution (e.g., unique set of weights) with minimum variance involve creating a linear system based on the constraints and solving the linear system using conventional linear algebra calculations. Such convention techniques include a predictor-corrector method. In such examples, a set of weights is arbitrarily selected and two linear systems (e.g., the predictor and the corrector linear system) are created to a) predict an adjustment to the selected set of weights and b) adjust the prediction to abide by constraints. During an iteration the selected weights are predicted by solving the predictor linear system and then corrected by inputting the predictor solutions into the corrector linear system. Once a set of weights applied to the linear systems, the selected weights are adjusted based on a solution from the corrector linear system. In such examples, the process is repeated such that each time the resultant set of weights are applied to the linear systems they are adjust to a set of weights closer to an optimal solution. The set of weights converges to a unique solution (e.g., the optimal solution). However, a number of elements in the linear systems dramatically increases as the number of unknowns (e.g., demographic categories and/or number of panelists) increases; thereby, increasing the amount of memory needed to solve the linear system. In fact, modern computer systems do not have enough available memory to determine a unique solution for some medium-to-large scale problems. Thus, conventional techniques of solving linear equations based on medium sized problems are not scalable or memory efficient.

Unlike such conventional techniques, example methods and apparatus disclosed herein implement technical solutions to address technical problems associated with finding a minimum variance solution for a constrained weight problem in a scalable and memory efficient matter. More specifically, example technical solutions disclosed herein eliminate the need to store the potentially large linear systems associated with the unique solution by solving the linear systems analytically such that the amount of computer memory required to solve the linear system is dramatically reduced. Technical solutions allow for acquiring optimal weights (e.g., weights that satisfy specific conditions and minimize variance) that could previously not be acquired via a computer. In some examples, the size reduction of a matrix using example methods and apparatus disclosed herein is on the order of 4,500 times less in size than the conventional techniques. This magnitude not only allows for larger systems to be calculated via a computer than conventional techniques, but also faster calculation of the optimal weights.

An example medium-scaled problem may include 10,000 sample panelists with 100 constraints (e.g., different demographics) from a total population. In order to determine a unique set of weights for each of the 10,000 panelists that represent the total population such that each weight is non negative and variance is minimized, linear systems must be stored into memory including a matrix with over 404 million entries. A large-scaled problem may include 100,000 sample panelists from the total population with 100 constraints. In such examples, a linear system must be stored into memory including a matrix with over $4\times10^{10}$ entries, far exceeding the memory available by modern computer systems. Example methods and apparatus disclosed herein solve medium-scaled to large-scaled problems that cannot be solved using conventional techniques. Such methods and apparatus determine a set of weights that represent the total population wherein the number of entries for a matrix that needs to be stored into memory is no larger than the number of inputs. For example, the number of entries needed to be stored into memory for the medium-scaled problem (e.g., 10,000 panelists with 100 constraints) is 1 million (e.g., about 1/404 the number of entries using conventional methods) and the number of entries needed to be stored into memory for the large-scaled problem (e.g., 100,000 panelist with 100 constraints) is 10 million (e.g., about 1/4000 the number of entries using conventional methods).

Variance is a statistical measurement of a data set that is indirectly correlated to effective sample size (e.g., as variance is decreased, the effective sample size is increased). As the effective sample size increases, the precision of the sample increases. Increased precision leads to less expensive and more accurate estimations. Thus, samples with small variance are useful for making accurate estimations. Given some data 'x' and some frequency 'f', the variance is computed using the following formula:

$$\text{Var}(X) = \frac{1}{N^2}\sum_{i=1}^{n}\sum_{j=1}^{n}\frac{1}{2}f_i f_j (x_i - x_j)^2, \text{ where } N = \sum_{i=1}^{n} f_i$$

For some matrix H where:

$$H = \text{diag}(p) - pp^T, \text{ where } p_i = \frac{f_i}{\sum_{i=1}^{n} f_i}$$

Then, $$\begin{aligned}x^T H x &= x^T(\text{diag}(p) - pp^T)x \\ &= x^T(\text{diag}(p)x - pp^T x) \\ &= (x^T \text{diag}(p)x) - (x^T p)(p^T x) \\ &= \left(\sum_{i=1}^{n} p_i x_i^2\right) - \left(\sum_{i=1}^{n} p_i x_i\right)^2 = \text{Var}(X)\end{aligned}$$

Therefore, in order to minimize variance for a set of weights one would need to minimize x for Var(X)=$x^T H x$, where H, as defined above, is conventionally known as the Hessian matrix. As shown above, variance is expressed in quadratic form. In this manner, the solution that minimizes the quadratic equation is the same solution that minimizes variance. Although the Hessian, H, may be arbitrary, examples disclosed herein specifically define H such that $x^T H x$ equals the variance.

Example methods, apparatus, and articles of manufacture disclosed herein determine a solution to a linear system to find an optimal set of weights based on a set of constraints without storing the linear system into memory. The linear system is solved analytically using various techniques to break the linear system into smaller problems to be solved separately, thus conserving memory. In this manner, each calculation used to solve the linear system involves matrices no larger than the dimensions of a constraint matrix based on the set of constraints. The various techniques involve repeated application of block-inversion formula and Sherman-Morrison formula.

The audience measurement entity enlists a plurality of media consumers (often called panelists) to cooperate in an audience measurement study (often called a panel) for a predefined length of time. The media consumption habits and demographic data associated with these enlisted media consumers is collected and used to statistically determine the size and demographics of the entire audience of the media presentation. In order to determine media exposure data for demographics related to a total population (e.g., universe) of users, a separate weight may be applied (e.g., multiplied) to each panelist such that after the weights are applied, the sample matches the population. For example, if there are 4 panelists (e.g., 2 male and 2 female) for a total population of 100 people (e.g., 40 males and 60 females), there are a variety of weights that can be applied to the panelist to represent the total population. For example:

|  | Male 1 | Male 2 | Female 1 | Female 2 |
|---|---|---|---|---|
| Combination 1 | 40 | 0 | 60 | 0 |
| Combination 2 | 0 | 40 | 0 | 60 |
| Combination 3 | 10 | 30 | 10 | 50 |
| Combination 4 | 20 | 20 | 30 | 30 |

Although there are many solutions, there is only one unique solution that has all non-negative entries that minimizes variance (e.g., the optimal solution). In order to determine the unique solution, multiple linear equations must be solved recursively until an arbitrary set of weights converges to a desired unique set of weights. The linear equations are based on the population, the panel (e.g., the panelists and the demographics), and the set of constraints (e.g., non-negative, bounded, minimum variance, etc.). However, as the number of panelists and demographics increases, the size of the linear systems required to determine the unique solution becomes larger. For medium-scaled to large-scaled problems the number of entries is too large to store into memory of modern computer systems.

Example methods, apparatus, and articles of manufacture disclosed herein determine a unique set of weights for a panel of panelists based on a set of constraints without storing linear systems into memory. The linear systems (e.g., a predictor linear system and a corrector linear system) are solved analytically using various techniques to break the linear systems into smaller problems to be solved separately, thus conserving memory. In this manner, each calculation used to solve the linear system involves matrices no larger than the dimensions of a constraint matrix based on the set of constraints. The various techniques involve repeated application of block-inversion formula and Sherman-Morrison formula. Once the solution to the predictor linear system is found the solution is applied to the corrector linear system to determine a set of adjustments, the set of adjustments are applied to an arbitrary set of weights and the process is repeated until the arbitrary set of weights converges to a unique solution. The unique solution (e.g., optimal weights) may be applied (e.g., multiplied) to the panel of panelists. Data from the weighted panelists are used to represent the total population.

An example method for determining a plurality of weights for a plurality of panelist representative of a population is described herein. Such disclosed examples include storing a constraint matrix and a population matrix into a memory, the constraint matrix representing first demographics associated with a plurality of panelists in a population, the population matrix representing second demographics of the population. Such disclosed examples include determining, via a processor, a linear system based on a set of constraints including the constraint matrix and the population matrix. Such disclosed examples include determining, via a processor, an inverse of a matrix of the linear system, the determination of the inverse including breaking down the matrix into blocks, the dimensions of the blocks being no larger than dimensions of the constraint matrix. Such disclosed examples include outputting a set of weights based on the inverse of the linear system, the set of weights satisfying the set of constraints.

An example method disclosed herein includes storing a constraint matrix and a population matrix into a memory, the population matrix representing a population related to data of the constraint matrix. Such disclosed examples include determining, via a processor, a linear system based on a set of constraints including the constraint matrix and the population matrix. Such disclosed examples include determining, via a processor, an inverse of a matrix of the linear system, the determination of the inverse including breaking down the matrix into blocks, the dimensions of the blocks being no larger than dimensions of the constraint matrix. Such disclosed examples include outputting a set of weights based on the inverse of the linear system, the set of weights satisfying the set of constraints.

Turning to the figures, FIG. 1 illustrates an example environment in which a unique set of weights that minimize variance is determined based on a sample of panelists in a total population. FIG. 1 includes an example total population 100, an example sample 102, example panelist data 104, example population data 106, an example audience measurement entity (e.g., AME) 108, an example collector 110, and an example sample calibrator 112.

The example total population 100 is a total population of users of a particular device (e.g., an audience). For example, the total population 100 may be a total population of television viewers, computing device users, mobile device users, radio listeners, Internet users, video game users, and/or any population of media users. Data, including demographic data, may be obtained and/or known for the example total population 100. The data from the example total population 100 is represented in the population data 106. The example population data 106 is obtained and stored. In some examples, population data may be obtained from a database proprietor that provides service to large numbers of subscribers. Such service may include, but is not limited to, cable television services, email services, social networking services, news media services, cloud storage services, streaming music services, streaming video services, satellite radio services, cellular services, video gaming services, online retail shopping services, credit monitoring services, etc. In some examples, the database proprietor maintains user account records corresponding to users registered for the media services provided by the database proprietors. The user account records may include demographic information (e.g., gender, age, income, location, education level, occupation, etc.). In some examples, however, media usage data may not be known for the total population 100. Alternatively, media usage data may not be released to the example AME 108. Additionally, although general demographics may be known (e.g., the number of 16-25 year olds, the number of males, the number of users whose income is less than $50,000), complex demographics (e.g., the number of 16-25 year old males making less than $50,000) may not be known or released to the example AME 108.

In order to determine the media usage behavior and/or complex demographics of the example total population 100, an example sample 102 may be used. The example sample 102 is a group (e.g., a panel) of monitored panelist within the total population 100. Data from the panelist may be acquired using local people meters, portable people meters, surveys, and/or any other means for obtaining data from a panelist. The data, including media usage data and detailed demographic data, of the example sample 102 are represented in the example panelist data 104. The example panelist data 104 is obtained, stored, and calibrated to represent the total population 100.

In the illustrated example, the AME 108 does not provide the media to the total population 100 and is a trusted (e.g., neutral) third party (e.g., The Nielsen Company, LLC) for providing accurate media access (e.g., exposure) statistics. The AME 108 establishes a panel of users (e.g., the example sample 102) who have agreed to provide their demographic information and to have their media exposure activities monitored. When an individual joins the sample 102 (e.g., a panel), the individual (e.g., panelist) provides detailed information concerning the person's identity and demographics (e.g., gender, age, ethnicity, income, home location, occupation, etc.) to the AME 108.

The example AME 108 includes the example collector 110 and the example sample calibrator 112. The example collector 110 collects the example panelist data 104 (e.g., media exposure data and demographic data from the sample 102) and the example population data 106 (e.g., demographics data from the total population 100). In some examples, the panelist data 104 and the population data 106 are transmitted to the example AME 108 via a network (e.g., a local area network, a wide area network, the Internet, a cloud, or any other type of communications network). The sample collector 110 sends the collected panelist data 104 and population data 106 to the example sample calibrator 112. The example sample calibrator 112 calibrates the panelist data by determining a set of weights that, when applied to the panelist data in the sample 102, optimally represent the total population 100, as further described in FIG. 2. For example, the sample calibrator 112 may determine that the optimal weight for a 25-25 year old male panelist is 12.2. In such examples, if the panelist is exposed a single media event (e.g., viewing a television show), the single event is credited to 25-35 year old males 12.2 times.

Figure 2:
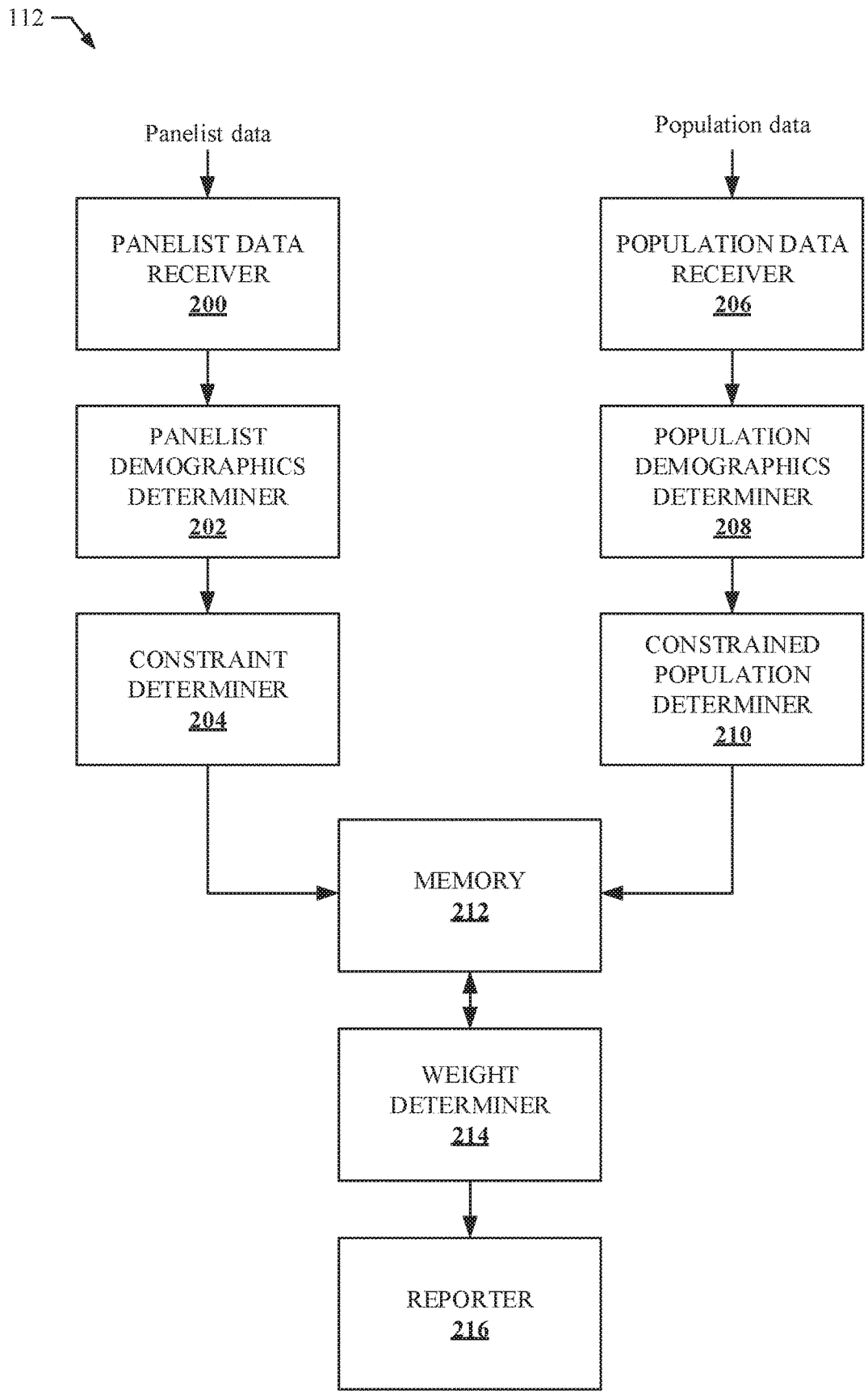
FIG. 2 is a block diagram of an example implementation of the sample calibrator of FIG. 1.

FIG. 2 is a block diagram of an example implementation of the example sample calibrator 112 of FIG. 1, disclosed herein, to create an optimal set of weights that, when applied to the sample 102, cause the weighted sample to accurately represent the total population 100 while minimizing variance. As previously described, although the optimal solution described herein is the solution that follows a set of constraints while minimizing variance, the optimal solution may optimize any criteria. The sample calibrator 112 of FIG. 2 includes an example panelist data receiver 200, an example panelist demographics determiner 202, an example constraint determiner 204, an example population data receiver 206, an example population demographics determiner 208, an example constrained population determiner 210, example memory 212, an example weight determiner 214, and an example reporter 216.

The example panelist data receiver 200 receives the example panelist data 104 stored in, or received by, the example AME 108 of FIG. 1 and sends the panelist data 104 to the example panelist demographics determiner 202. The panelist demographic determiner 202 divides the panelist data into multiple demographic buckets (e.g., male or female) for at least one demographic group (e.g., gender). The amount and/or type of demographics may be preset or based on user and/or administer preferences. For example, the panelist demographics determiner 202 may divide each panelist in the sample 102 into demographic buckets for each of the three demographics: gender, income, and location. In this example, the example panelist demographics determiner 202 may determine a gender, an income bracket, and a location for each panelist based on the panelist data 104, as further described in FIG. 3A.

Once the example panelist demographics determiner 202 divides the panelist into the demographic buckets for each demographic, the constraint determiner 204 creates a constraint matrix based the panelists and demographic data. The dimensions of the constraint matrix are (c, n) where c is the number of demographic constraints (e.g., Male, Female, low income, medium income, high income, etc.) and n is the panelists in the sample panel. Once the example constraint determiner 204 creates the constraint matrix, the constraint matrix is stored into example memory 212.

The example population data receiver 206 receives the example population data 106 stored in the example AME 108 of FIG. 1 and sends the population data 106 to the example population demographics determiner 208. The population demographic determiner 208 determines the total number of users in the example population 100 for each demographic bucket used by the example panelist demographic determiner 202. The amount and/or type of demographics may be preset or based on user and/or administer preferences. For example, the population demographics determiner 208 may determine a total number of people from the population that fit into demographic buckets for three demographics: gender, income, and location. The demographic totals for each bucket is determined based on the population data 106, as further described in FIG. 3B.

Once the example population demographics determiner 208 determines population totals for the demographic buckets for each demographic, the constrained population determiner 210 creates a constrained population matrix based on the totals. The dimensions of the constrained population matrix are (c, 1) where c is the number of constraints (e.g., based on the number of demographic buckets). Once the example constrained population determiner 210 creates the constrained population matrix, the constrained population matrix is stored into the example memory 212.

The example weight determiner 214 gathers the constraint matrix and the constrained population matrix from the example memory 212 to determine and output a set of optimal weights that, when applied to the panelists of the example sample 102, accurately match the example total population 100 while minimizing variance. Additionally, the weight determiner 214 may receive various other constraints including an equality constraint (e.g., an equation where the product of the constraint matrix and an unknown weight matrix equals the constrained population matrix) a non-negative constraint (e.g., the weights need to be positive), and/or a boundary constraint (e.g., the weights are bounded above and/or below a threshold amount). The example weight determiner 214 determines an initial set of weights to optimize and example linear systems (e.g., a predictor and corrector linear system) based on a minimum variance condition and the set of constraints. For example, the linear system may be based on the following three conditions:

1) $\min_{x} \mathrm{Var}(x) = x^T H x$, subject to

2) $Ax = B$ (e.g., equality constraint) and

3) $x \geq 0$ (e.g., non-negative constraint)

Where A is the constraint matrix, B is the constrained population matrix, x is a matrix of the unknown weights, and H is a Hessian matrix as previously described.

In this manner, a predictor linear system is created to determine how to adjust an arbitrary set of weights to minimize variance given an equality constraint and a non-negative constraint. An example predictor linear system is shown below:

$$\begin{bmatrix} -H & A^T & I \\ A & 0 & 0 \\ D_z & 0 & D_x \end{bmatrix} \begin{bmatrix} d_x \\ d_y \\ d_z \end{bmatrix} = \begin{bmatrix} r_d \\ r_p \\ r_{cz} \end{bmatrix}$$

Where $D_z$, for a column slackvector z (e.g., defined as $z=A^T x - B$, where $z>0$), is a diagonal matrix with values equal to z, $D_x$, for a column Lagrange multiplier vector x (e.g., based on the inequality constraint), is a diagonal matrix with values equal to x, $r_d$, $r_p$, and $r_{cz}$ are residual vectors based on the population data, and $d_x$, $d_y$, and $d_z$ are vectors to related to an amount of adjustment to apply to an arbitrary set of weights to lead to the optimal solution. Additionally, the solutions (e.g., $d_x$, $d_y$, and $d_z$) may be corrected to satisfy other constraints in the predictor step. In this manner, the solutions from the predictor linear equation are used to solve a second corrector linear system. Solving the corrector linear system adjusts the predictor solutions to satisfy constraints. An example corrector linear system is shown below:

$$\begin{bmatrix} -H & A^T & I \\ A & 0 & 0 \\ D_z & 0 & D_x \end{bmatrix} \begin{bmatrix} d'_x \\ d'_y \\ d'_z \end{bmatrix} = \begin{bmatrix} r_d \\ r_p \\ r_c - D_z d_x d_z e + \sigma \mu e \end{bmatrix}$$

Where $d'_x$, $d'_y$, and $d'_z$ are the corrector solutions used to adjust the initial set of weights toward an optimal solution. Additionally, $$\sigma = \frac{(z + \alpha d_z)^T (y + \alpha d_y)}{z_0^T y_0}, \mu = \frac{z_0^T y_0}{m},$$

where m is the number of inequality constraints, and a can be defined by solving the following linear system:

$$\alpha \geq \frac{y}{d_y}, \alpha \geq \frac{z}{d_z}$$

In some examples, the linear system may be based on a bound constraint (e.g., the solutions must be above a lower bound, L, and an upper bound, U). In this manner, the linear system that satisfies the minimum variance, equality constraint, and bound constraint is:

$$\begin{bmatrix} -H & A^T & I & -I \\ A & 0 & 0 & 0 \\ I & 0 & D_{szL} & 0 \\ -I & 0 & 0 & D_{szU} \end{bmatrix} \begin{bmatrix} d_x \\ d_y \\ d_{z1} \\ d_{z2} \end{bmatrix} = \begin{bmatrix} r_d \\ r_p \\ r_{cz1} \\ r_{cz2} \end{bmatrix}$$

Where $D_{szL}$ is, for a column Lagrange multiplier vector szL (e.g., based on the lower bound), is a diagonal matrix with values equal to szL, $D_{szU}$ is, for a column Lagrange multiplier vector szU (e.g., based on the upper bound), is a diagonal matrix with values equal to szU.

The example weight determiner 214 solves the linear equation by taking the inverse of the matrix on the left (e.g., defined herein as the Jacobian matrix) analytically such that the Jacobian does not need to be stored in memory 212. Alternatively, the method shown below may be used to invert and N×N matrix $$\begin{bmatrix} d_x \\ d_y \\ d_z \end{bmatrix} = \begin{bmatrix} -H & A^T & I \\ A & 0 & 0 \\ D_z & 0 & D_x \end{bmatrix}^{-1} \begin{bmatrix} r_d \\ r_p \\ r_{cz} \end{bmatrix} \xrightarrow{yields} \begin{bmatrix} -H & A^T & I \\ A & 0 & 0 \\ D_z & 0 & D_x \end{bmatrix}^{-1} = \begin{bmatrix} B_1 & B_2 & B_3 \\ B_4 & B_5 & B_6 \\ B_7 & B_8 & B_9 \end{bmatrix}$$

As the number of constraints and panelists increases, the Jacobian increases exponentially. For example, for a linear equation containing a bound constraint which has 10,000 panelists with 100 constraints, the Jacobian will have $9 \times 10^8$ entries, far exceeding the memory available on a computer. The example weight determiner 214 finds a solution to the linear system analytically, such that neither the Jacobian nor the Hessian needs to be stored into memory or computing using conventional techniques (e.g., taking the inverse of the Jacobian numerically and multiplying by the residual vectors). In this manner, the example weight determiner 214 is able to solve large scale problems that were previously unsolvable by a computer, as further describe in FIG. 6.

The example reporter 216 of FIG. 2 generates reports including data related to the optimal weights. In some examples, the reports include data relating to the example panelist data 104, the example population data 106, the weights, data relating to applying the weights, etc. The reports may further include audience ratings, media content access metrics, specific demographic data, usage profiles, or any other type of audience measurement data.

Figures 3A, 3B:
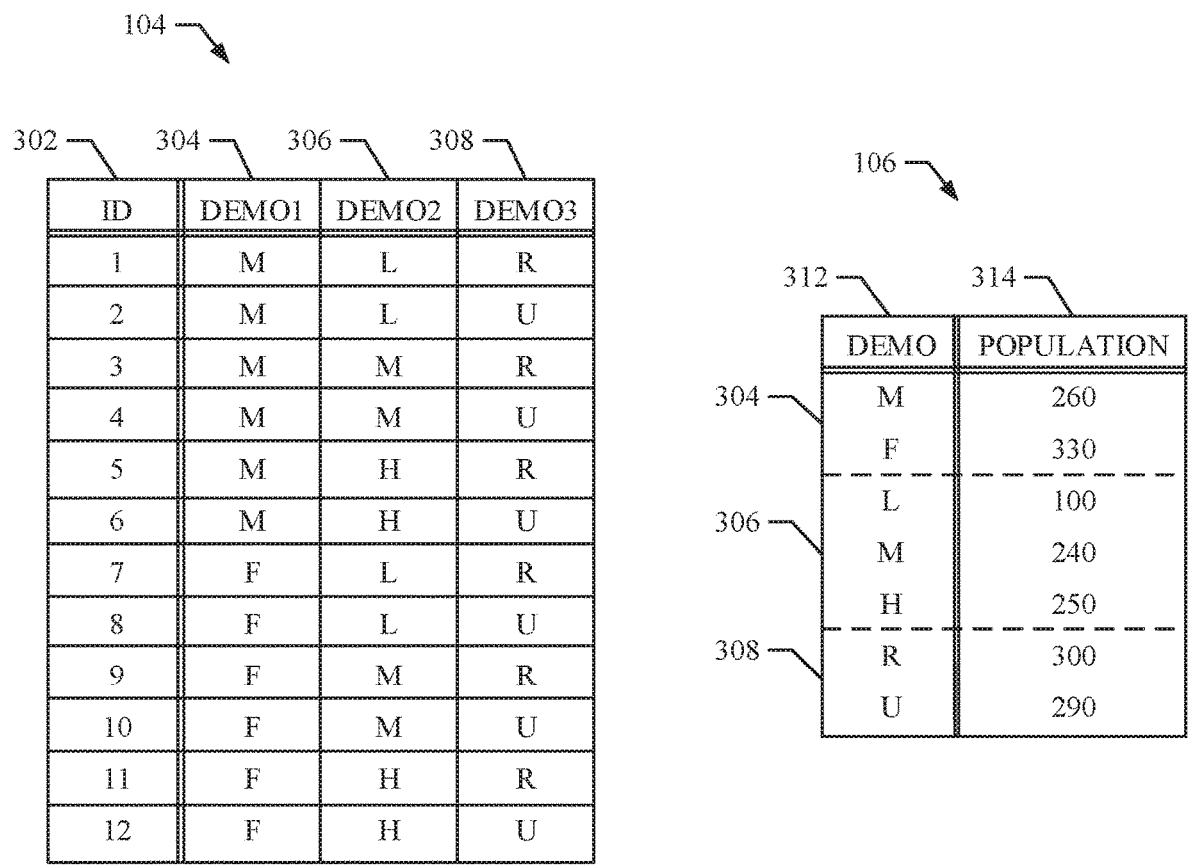
FIG. 3A is example panelist data to be calibrated by the sample calibrate of FIG. 1 and/or FIG. 2.
FIG. 3B is example population data used to calibrate the panelist data of FIG. 3A.

FIG. 3A is an illustration of example panelist data 104 from the example sample 102 of FIG. 1. In the illustrated example, the sample 102 includes twelve panelists. In some examples, the sample 102 may include any number of panelists. The example panelist data 104 includes an example identifier 302, a first example demographic 304, a second example demographic 306, and a third example demographic 308.

The example identifier 302 is a number, name, and/or code used to identify a panelist. In some examples, the identifier 302 may be a device identifier (e.g., a number and/or code associated with a device, etc.), a web browser unique identifier (e.g., a cookie), a user identifier (e.g., a user name, a login ID, etc.), identification information stored in an HTML5 datastore (where HTML is an abbreviation for hypertext markup language), and/or any other identifier that the AME 108 stores in association with demographic information about panelists in the example sample 102. In this manner, when the AME 108 receives the example identifier 302, the AME 108 may obtain demographic information corresponding to a panelist based on the identifier 302 that the AME 108 receives from a device associated with the panelist. In some examples, the identifier 302 may be encrypted (e.g., hashed) at the device so that only an intended final recipient of the example identifier 302 can decrypt the hashed identifier. For example, if the example identifier 302 is a cookie that is set in the device associated with the panelist by the AME 108, the example identifier 302 can be hashed so that only the AME 108 can decrypt the identifier 302. If the identifier 302 is an international mobile equipment identity (e.g., IMEI) number, the device can hash the example identifier 302 so that only a wireless carrier (e.g., the database proprietor) can decrypt the hashed identifier 302 to recover the IMEI for use in accessing demographic information corresponding to the panelist in the example sample 102. By hashing the example identifier 302, an intermediate party (e.g., an intermediate server or entity on the Internet) receiving the beacon request cannot directly identify a user of the example sample 102.

In the example illustration of FIG. 3A, three different demographics 304, 306, 308 are determined for each panelist. For example, the first example demographic 304 represents gender (e.g., M is male and F is female), the second example demographic 306 represents income level (e.g., L is low income, M is medium income, and H is high income), and the third example demographic 308 represents location (e.g., R is rural and U is urban). Based on the information in the example panelist data 104, it can be determined that the panelist associated with ID '12' is a female in the high income range living in an urban environment. Alternatively, any number and/or type of demographics may be used in addition and/or instead of the example demographics to describe the sample 102.

FIG. 3B is an illustration of example population data 106 from the example total population 100 of FIG. 1. In the illustrated example, the total population 100 includes a total number of 590 users. In some examples, the total population 100 may include any number of users. The example population data 106 includes an example demographic breakdown 312 and an example population breakdown 314 for the three example demographics 304, 306, 308 of FIG. 3A. As previously described, the example population breakdown 314 may be gathered and/or obtained from the example total population 100. In some examples, the population breakdown 314 may be obtained from a database proprietor that provides service to large numbers of subscribers. Such service may include, but are not limited to cable television services, email services, social networking services, news media services, cloud storage services, streaming music services, streaming video services, satellite radio services, cellular services, video gaming services, online retail shopping services, credit monitoring services, etc. In some examples, the database proprietor maintains user account records corresponding to users registered for the media services provided by the database proprietors. The user account records may include demographic information (e.g., gender, age, income, location, education level, occupation, etc.). In this example, the population data 106 is broken up into a total population for each of three example demographics (e.g., gender 304, income 306, and location 308). Alternatively, the total population for any number and/or types of demographics may be determined.

Based on the information from the population data 106 of FIG. 3B it known that the total number of females in the example total population 100 is 260 and the total number of males in the example total population 100 is 330 (e.g., summing to the total 590 users). Additionally, it is known that the example total population 100 contains 100 low income users, 240 medium income users, and 250 high income users (e.g., summing to the total 590 users). In this example, it is known that the example total population 100 contains 300 users located in rural areas and 290 users located in urban areas. As previously described, the example constraint determiner 204 creates a constraint matrix and the example constrained population determiner 210 creates a constrained population matrix as shown in FIGS. 4A and 4B.

Figures 4A, 4B:
FIG. 4A is example constraint matrix based on the panelist data of FIG. 3A.
FIG. 4B is example constrained population matrix based on the population data of FIG. 3B.

FIG. 4A is an example constraint matrix 400 created by the example constraint determiner 204 based on the example panelist data 104 of FIG. 3A. The example constraint matrix 400 includes example columns representing demographic buckets for each demographic of FIG. 3A and example rows representing the different panelists of FIG. 3A. For example, example column 402 represents males, example column 404 represents females, example column 406 represents low income, example column 408 represents medium income, example column 410 represents high income, example column 412 represents rural location, and example column 414 represents urban location. In this example, row 416 represents a panelist associated with the example identifier '12' of FIG. 3A. The example panelist '12' is a female with high income in an urban area as represented by placing a '1' in the example female column 404, the example high income column 408, and the example urban column 414. A '0' will be entered in the other example columns within the example row 416 (e.g., since panelist '12' does not belong to those demographic buckets).

FIG. 4B is an example constrained population matrix 418 determined by the example constrained population determiner 204 based on the example population data 106 of FIG. 3A. In this example, the example constrained population matrix 418 is defined as matrix B. The example constrained population matrix 218 includes an example totals column 420 representing to the total number of users for each demographic group of FIG. 3B. For example, the example column 420 includes 260 males, 330 females, 100 low income users, 240 medium income users, 250 high income users, 300 rural users, and 290 urban users to represent the totals of FIG. 3B.

The example sample calibrator 112 determines the optimal weights (e.g., the weights that satisfy the constraints and minimize variance) that, when applied to the sample, accurately represent the population, without requiring a processor to store and/or calculate a matrix whose dimensions are larger than the constraint matrix 400 of FIG. 4A. The illustrated example of FIGS. 4A and 4B is a small-scale problem (e.g., the Jacobian will have only 441 entries) that can easily be solved by a processor. However, when the number of panelists and/or demographics increases, the number of entries of the Jacobian quickly becomes too large to store in memory of a modern computer. For example, a Jacobian for a problem with 100,000 panelists with 100 different demographics has more than $4 \times 10^{10}$ entries. The example sample calibrator 112 may determine the optimal weights without storing the large and unmanageable Jacobian associated with the optimal weights, which is exponentially larger than the constraint matrix 400, as further described in FIGS. 5-7B. The result is a determination of weights for large scale problems that previously would be impossible to determine.

While example manners of implementing the example sample calibrator 112 of FIG. 1 are illustrated in FIG. 2, elements, processes and/or devices illustrated in FIG. 2 may be combined, divided, re-arranged, omitted, eliminated and/or implemented in any other way. Further, the example panelist data receiver 200, the example panelist demographics determiner 202, the example constraint determiner 204, the example population data receiver 206, the example populations demographics determiner 208, the example constrained population determiner 210, the example weight determiner 214, the example reporter 216, and/or, more generally, the example sample calibrator 112 of FIG. 2 may be implemented by hardware, machine readable instructions, software, firmware and/or any combination of hardware, machine readable instructions, software and/or firmware. Thus, for example, any of the example panelist data receiver 200, the example panelist demographics determiner 202, the example constraint determiner 204, the example population data receiver 206, the example populations demographics determiner 208, the example constrained population determiner 210, the example weight determiner 214, the example reporter 216, and/or, more generally, the example sample calibrator 112 of FIG. 2 could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example panelist data receiver 200, the example panelist demographics determiner 202, the example constraint determiner 204, the example population data receiver 206, the example populations demographics determiner 208, the example constrained population determiner 210, the example weight determiner 214, the example reporter 216, and/or, more generally, the example sample calibrator 112 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example sample calibrator 112 of FIG. 2 include elements, processes and/or devices in addition to, or instead of, those illustrated in FIGS. 5-7B, and/or may include more than one of any or all of the illustrated elements, processes and devices.

Flowcharts representative of example machine readable instructions for implementing the example sample calibrator 112 of FIG. 2 are shown in FIGS. 5-7B. In the examples, the machine readable instructions comprise a program for execution by a processor such as the processor 812 shown in the example processor platform 800 discussed below in connection with FIG. 8. The program may be embodied in machine readable instructions stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 5-7B, many other methods of implementing the example sample calibrator 112 of FIG. 2 may alternatively be used. For example, the order of execution of the blocks may be changed, and/or some of the blocks described may be changed, eliminated, or combined.

As mentioned above, the example processes of FIGS. 5-7B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-7B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 5:
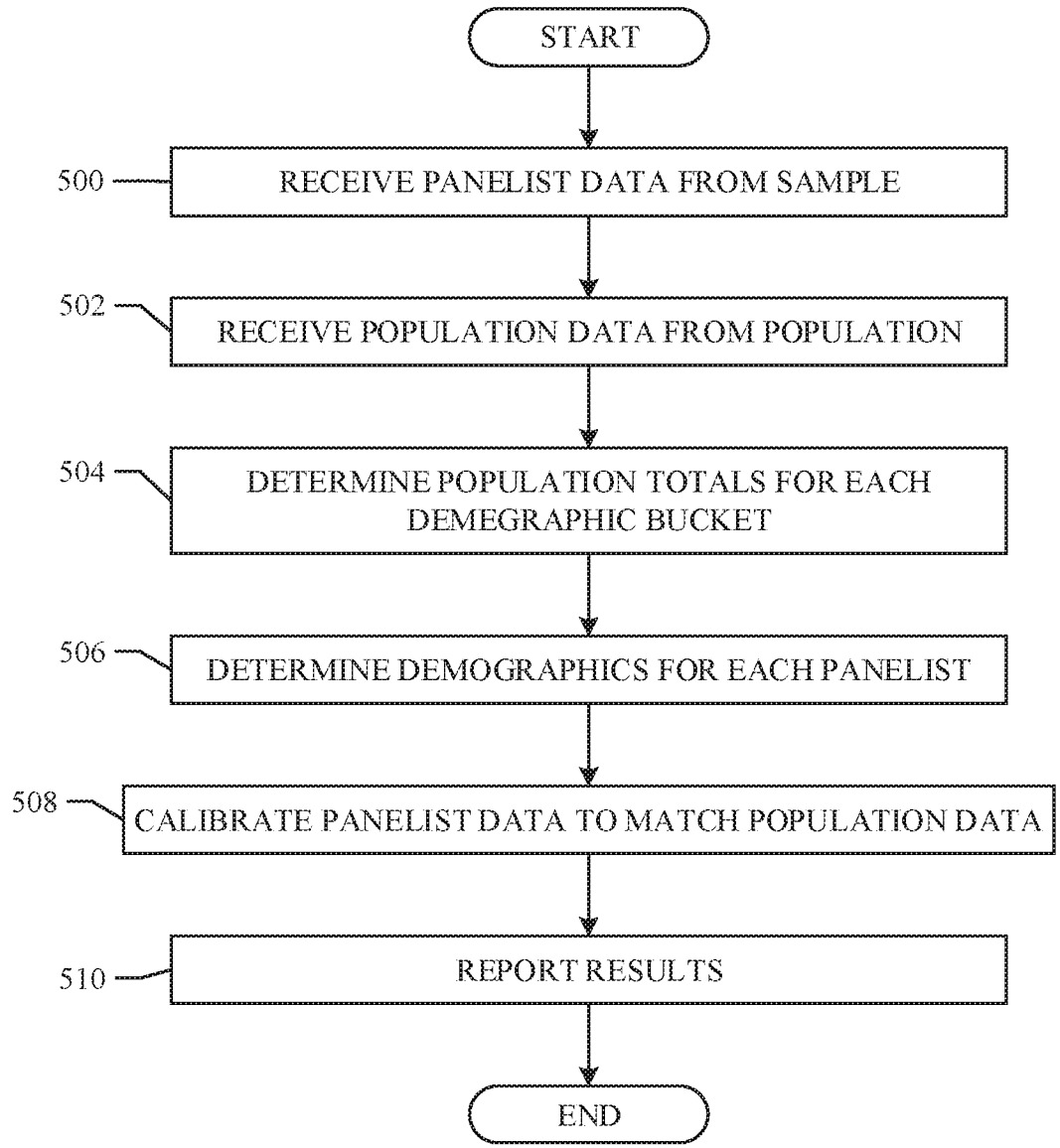
FIGS. 5-7B are flowcharts representative of example machine readable instructions that may be executed to implement the sample calibrator of FIG. 1 and/or FIG. 2.

The example machine readable instructions illustrated in FIG. 5 may be executed to cause the sample calibrator 112 of FIG. 2 to determine a set of weights that, when applied to the sample, accurately represent the population based on a set of constraints while minimizing variance. Although the flowchart of FIG. 5 depicts example steps in a given order, these steps are not exhaustive, various changes and modifications may be affected by one skilled in the art within the spirit and scope of the disclosure. For example, blocks illustrated in the flowchart may be performed in an alternative order or may be performed in parallel.

FIG. 5 is a flowchart representative of example machine readable instructions that may be executed to implement the sample calibrator 112 of FIG. 2 to find a minimum variance solution for a constrained weight problem in a scalable and memory efficient manner. At block 500, the example panelist data receiver 200 receives panelist data 104 from the example collector 110. The panelist data 104 includes data relating to demographics for each panelist as well as viewing data for each panelist. At block 502, the example population data receiver 206 receives example population data 106 from the example collector 110. The population data 106 includes data relating to a total number of users that belong to each of the demographics. The number and/or type of demographics may be entered by a user and/or administrator. Alternatively, the number and/or type of demographics may be preset and/or automatically selected by the example sample calibrator 112.

At block 504, the example population demographics determiner 208 determines the total number users in the example population 100 that belong to each demographic group based on the received population data 106. For example, the population demographics determiner 208 may determine that there are 575,000 males and 492,000 females in a population of television users. The example panelist demographic determiner 202 determines demographics for each panelist based on the received panelist data 104 (block 506). For example, the panelist demographic determiner 202 may determine that a first panelist is male, a second panelist is female, etc. At block 508, the example sample calibrator 112 calibrates the example panelist data 104 to match the population data 106 based on a set of constraints while minimizing variance, as further described in FIG. 6. The example reporter 216 generates a report including the example panelist data 104, the example population data 106, and data relating to the calibration (e.g., the optimal weights, demographic data, etc.)(block 510).

Figure 6:
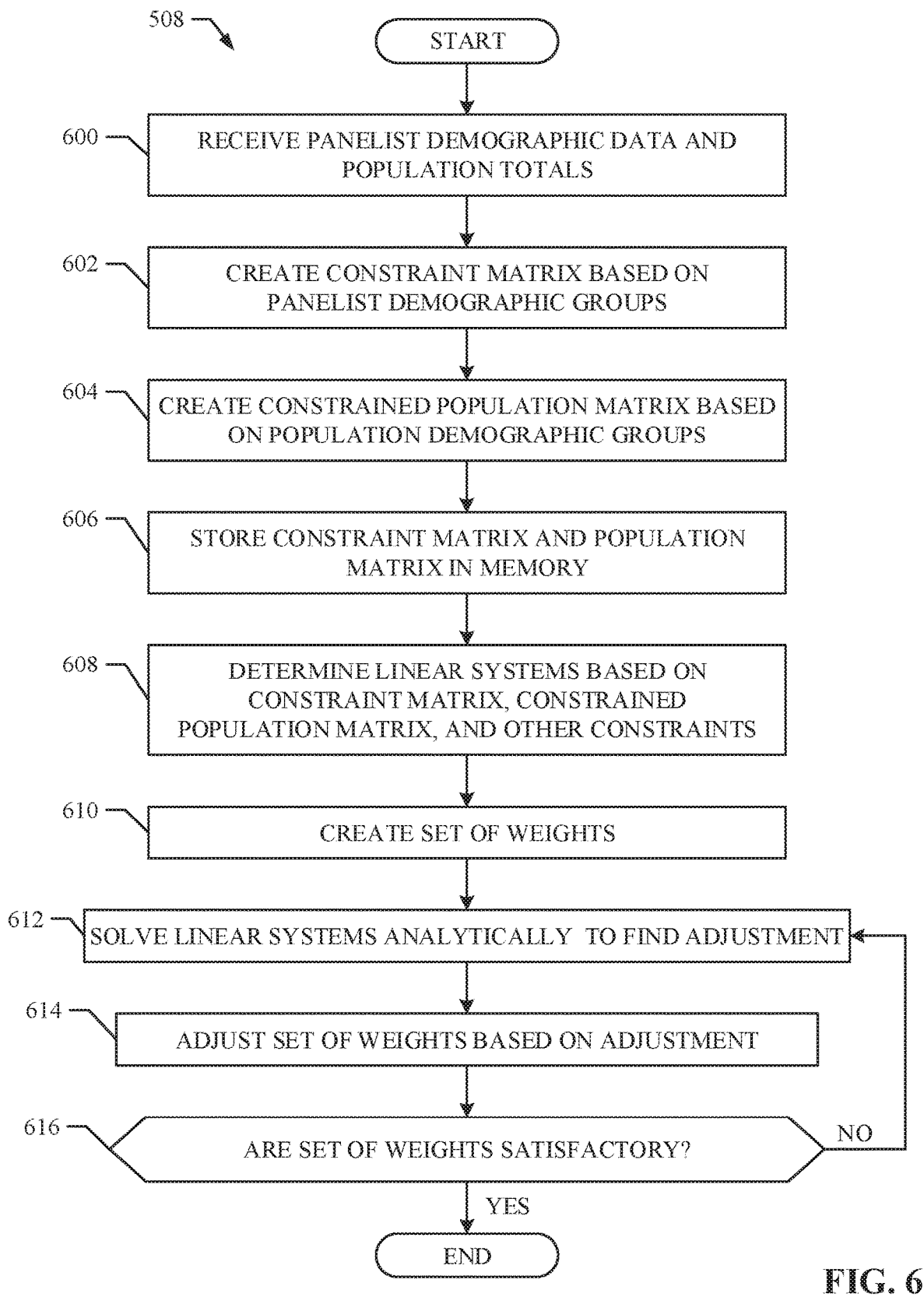

The example machine readable instructions illustrated in FIG. 6 may be executed to cause the sample calibrator 112 of FIG. 2 to determine a set of weights that, when applied to the sample, accurately represent the population based on a set of constraints while minimizing variance. Although the flowchart of FIG. 6 depicts example steps in a given order, these steps are not exhaustive, various changes and modifications may be affected by one skilled in the art within the spirit and scope of the disclosure. For example, blocks illustrated in the flowchart may be performed in an alternative order or may be performed in parallel.

FIG. 6 is a flowchart representative of example machine readable instructions that may be executed to implement the sample calibrator 112 of FIG. 2 to calibrate example panelist data 104 to match the example population data 106 as shown in block 508 of FIG. 5. At block 600, the example constraint determiner 204 receives the demographic data from the example panelist demographics determiner 202 and the example constrained population determiner 208 receives the population demographic totals from the population demographics determiner 208. As previously described, the number and/or type of demographics may have been created by a user and/or administrator based on the preferences of the user and/or administrator. Alternatively, the number and/or type of demographics may be preset based on the data received from the example panelist demographic determiner 202.

At block 602, the example constraint determiner 204 creates a constraint matrix based on the received demographic data from the sample of panelists, as previously described in FIG. 4A. The example constrained population determiner 210 creates a constrained population matrix based on population totals for each demographic (block 604), as previously described in FIG. 4B. Once the constraint matrix and the constrained population matrix have been created, the constraint matrix and the constrained population matrix are stored into the example memory 212 (block 606). As described throughout, in order to conserver memory and find optimal solutions in a scalable manner, the example weight determiner 214 can determine the optimal set of weights analytically without storing or calculating matrices whose dimensions are larger than the constraint matrix and the constrained population matrix.

At block 608, the example weight determiner 214 determines a predictor linear system and a corrector linear system based on the stored constraint matrix and the constrained population matrix stored in the example memory 212. In some examples, the linear systems are further based on other constraints (e.g., a non-negative constraint, a bound constraint, etc.). The other constraints may be based on a preset setting or a preference from a user and/or administrator depending on the purpose of the linear system.

At block 610, the example weight determiner 214 creates an initial set of weights. In some examples, the initial set of weights is a matrix (e.g., (c, 1)) in which every weight is 1. Alternatively, the initial values in the initial set of weights may be any numbers. The initial values are irrelevant since multiple iterations of linear systems (e.g., applying the initial values to a predictor and corrector linear system) will adjust (e.g., converge) the initial set of weights to the optimal values.

At block 612, the example weight determiner 214 solves the linear systems analytically to find a set of adjustments that, when applied to the initial set of weights data, brings the initial set of weights one step closer to an optimal set of weights. The linear systems include a predictor linear system and a corrector linear system as further described in FIGS. 7A and 7B. To conserve the example memory 212, the example weight determiner 214 determines adjustment values by solving the linear systems without using a calculation larger than the dimensions of the constraint matrix (e.g., (10,000, 100) for medium-scaled problem, (100,000, 100) for a large-scaled problem, etc.).

Once the adjustments have been determined by solving the linear equations, the example weight determiner 214 adjusts the initial set of weights based on the determined adjustments (block 614). As previously described, the adjustments bring the initial set of weights closer to the optimal set of weights. At block 616, the example weight determiner 214 determines if the adjusted set of weights are satisfactory. If the set of weights are not satisfactory, the example weight determiner 214 runs an additional iteration by solving the predictor and corrector linear system using the adjusted set of weights. In this manner, the set of weights can continue to converge (e.g., get closer) to the optimal set of weights. In some examples, the example weight determiner 214 may determine that the set of weights are satisfactory based on a number (e.g., count of iterations). For example, the example weight determiner 214 may run 10,000 iterations before it determines that the set of weights are satisfactory. Alternatively, the example weight determiner 214 may determine that the set of weights is satisfactory based on a threshold tolerance level (e.g., when the corrector solutions are less than $10^{-16}$). The determination of what constitutes as satisfactory may be determined based on user and/or manufacture settings. If the example weight determiner 214 determines that the weights are satisfactory, the process continues to block 510 of FIG. 5.

In some examples, the example weight determiner 214 applies the weights to the panelists. For example, if the example weight determiner 214 determines that an optimal weight for a panelist is 25.1, the example weight determiner 214 may credit demographics associated with the panelist 25.1 times for a single media exposure event. In some examples, once the weights are determined and/or applied to the example sample 102, the example reporter 216 may output a report regarding the optimal solution. The report may further include the panelist data, the population data, the constraints, the calculations, etc.

Figure 7A:
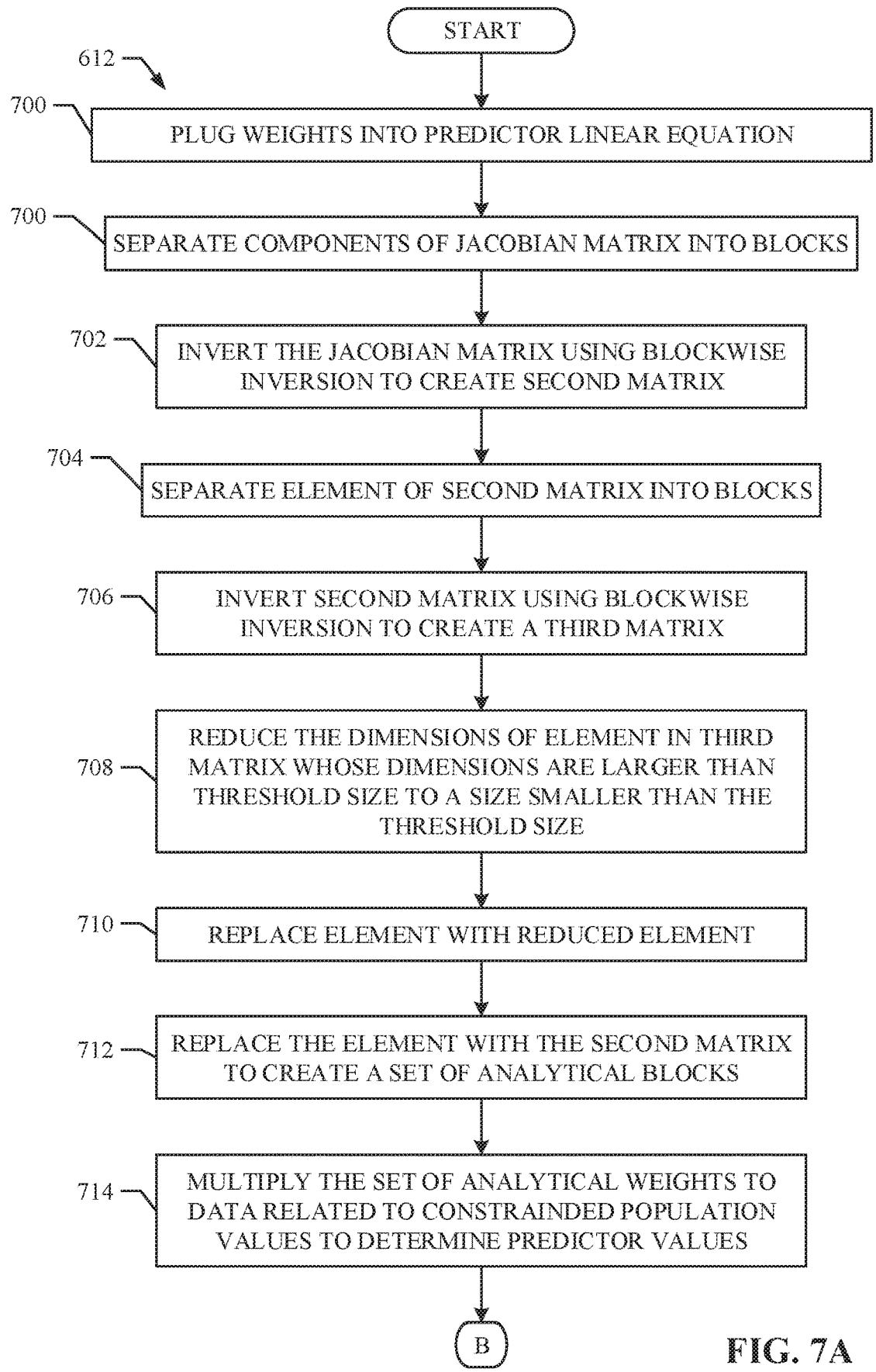
Figure 7B:
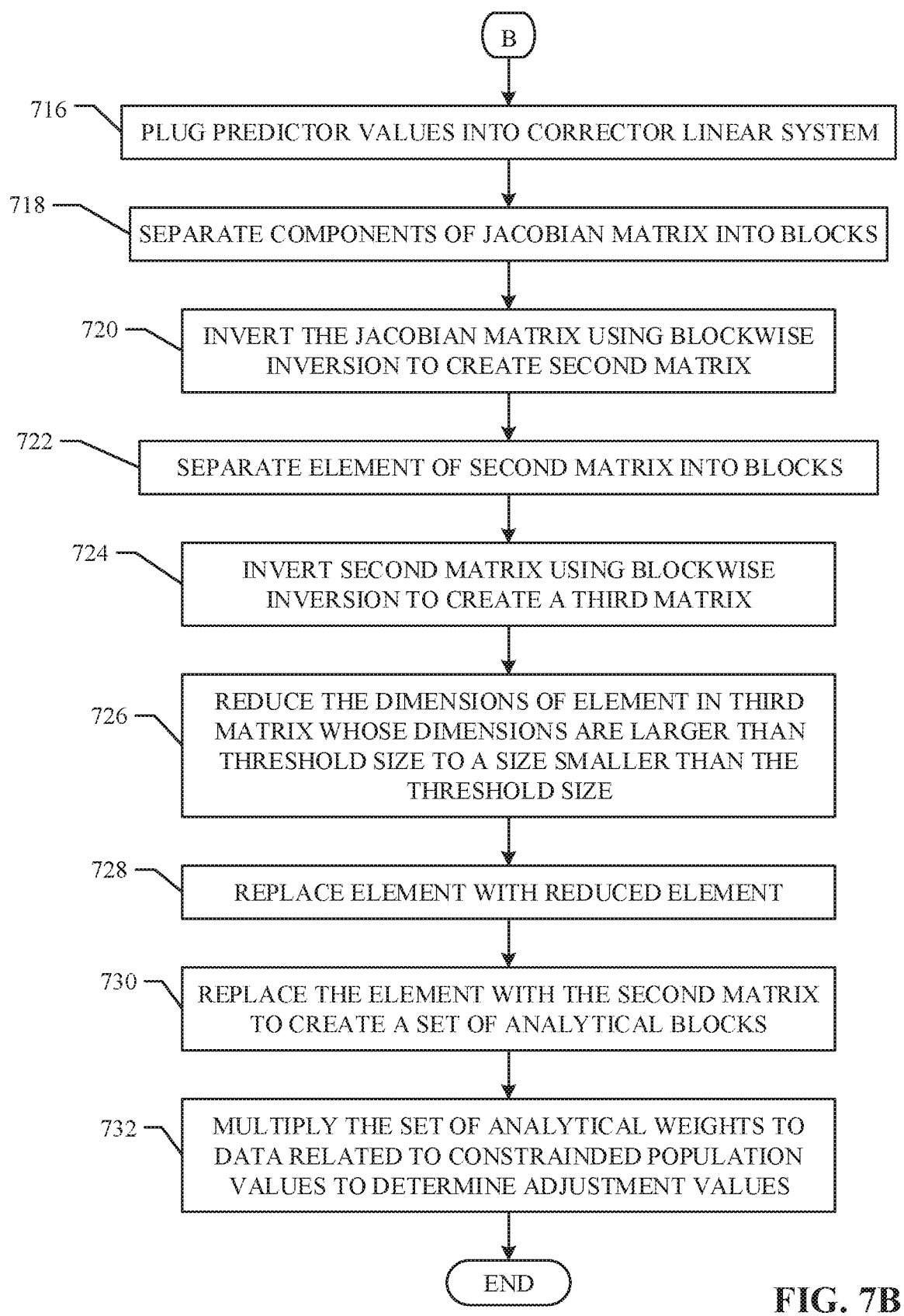

The example machine readable instructions illustrated in FIGS. 7A and 7B may be executed to cause the sample calibrator 112 of FIG. 2 to solve a predictor linear system based on an arbitrary set of weights and apply the solution to a corrector linear system to adjust the solution based on the set of constraints. Although the flowcharts of FIGS. 7A and B depict example steps in a given order, these steps are not exhaustive, various changes and modifications may be affected by one skilled in the art within the spirit and scope of the disclosure. For example, blocks illustrated in the flowchart may be performed in an alternative order or may be performed in parallel.

FIGS. 7A and 7B are flowcharts representative of example machine readable instructions that may be executed to implement the sample calibrator 112 of FIG. 2 to solve a predictor linear system and a corrector linear system analytically, as shown in block 610 of FIG. 6. In this manner, solving the linear systems analytically does not require storing the large linear system into the example memory 212. As previously described, determining the predictor adjustments involves finding the inverse of a Jacobian matrix associated with the linear system, as shown below:

$$\begin{bmatrix} d_x \\ d_y \\ d_z \end{bmatrix} = \begin{bmatrix} -H & A^T & I \\ A & 0 & 0 \\ D_z & 0 & D_x \end{bmatrix}^{-1} \begin{bmatrix} r_d \\ r_p \\ r_c \end{bmatrix} \rightarrow \begin{bmatrix} -H & A^T & I \\ A & 0 & 0 \\ D_z & 0 & D_x \end{bmatrix}^{-1} = \begin{bmatrix} B_1 & B_2 & B_3 \\ B_4 & B_5 & B_6 \\ B_7 & B_8 & B_9 \end{bmatrix}$$

Where $B_1$-$B_9$ are analytical blocks used to calculate the predictor adjustments.

At block 700, the weight determiner 214 separates components of the Jacobian matrix into blocks, as shown below:

$$\begin{bmatrix} -H & A^T & | & I \\ A & 0 & | & 0 \\ - & - & | & - \\ D_z & 0 & | & D_x \end{bmatrix}^{-1} \rightarrow \begin{bmatrix} E & | & F \\ - & | & - \\ G & | & J \end{bmatrix}^{-1} = M_1^{-1}$$

In this example, $-H$, $A^T$, $A$, and $0$ become $E$, $I$ and $0$ become $F$, $D_z$ and $0$ become $G$, and $D_x$ becomes $J$. As shown above, the block representation of the Jacobian is represented by $M_1$.

At block 702, the example Jacobian (e.g., $M_1$) is inverted using block-wise inversion, as shown below:

$$M_1^{-1} = \begin{bmatrix} (E - FJ^{-1}G)^{-1} & (E - FJ^{-1}G)^{-1}FJ^{-1} \\ -J^{-1}G(E - FJ^{-1}G)^{-1} & J^{-1} + J^{-1}G(E - FJ^{-1}G)^{-1}FJ^{-1} \end{bmatrix}$$

Since E is a matrix including the Hessian matrix H, E may be further broken up to reduce the dimensions of E. In this example, each component of $M_1^{-1}$ contains $(E-FJ^{-1}G)^{-1}$, therefore $(E-FJ^{-1}G)^{-1}$ may be separated into blocks in a similar fashion to block 700. At block 704, each element of $(E-FJ^{-1}G)^{-1}$ is separated into blocks as shown below:

$$(E - FJ^{-1}G)^{-1} = \begin{bmatrix} -(H+D_y) & A^T \\ A & 0 \end{bmatrix}^{-1} \rightarrow \begin{bmatrix} E_2 & F_2 \\ G_2 & J_2 \end{bmatrix}^{-1} = M_2^{-1}$$

Where the separation of $(E-FJ^{-1}G)^{-1}$ is labeled as $M_2^{-1}$.

At block 706, $M_2^{-1}$ is inverted using block-wise inversion, as shown below:

$$M_2^{-1} = \begin{bmatrix} E_2^{-1} + E_2^{-1}F_2WG_2E_2^{-1} & -E_2^{-1}F_2W \\ -WG_2E_2^{-1} & W \end{bmatrix}$$

where $W=(J_2-G_2E_2^{-1}F_2)^{-1}$, $F_2=A^T$, $G_2=A$.

In this example $E_2$ is the only component containing the Hessian matrix (e.g., $E_2=-(H+D_y)$). Since H is defined as $\text{diag}(p)-pp^T$, where $$p = \frac{n}{N}$$

and n represents frequency counts and N represents the total sum of the frequency counts, then $H+D_y=[\text{diag}(p)-pp^T]+[\text{diag}(y)]\rightarrow\text{diag}(p+y)-pp^T$. Therefore, by using Sherman-Morrison formula, the inverse of $H+D_y$ is calculated without computing the large Hessian H resulting in an expression for $E_2$ whose dimensions (e.g., [n, 1]) are smaller than a threshold size (e.g., [c, n]) (e.g., the size of the constraint matrix) (block 708), as shown below:

$$E_2^{-1} = -(H+D_Y)^{-1} = \text{diag}(-g) - \frac{ww^T}{1-w^Tp},$$

where $w = pg$, $g = \frac{1}{p+y}$, and $y = \frac{z}{x}$

Once the reduced expression for $E_2$ is calculated, it is substituted for $E_2$ (block 710). At block 712, $M_2^{-1}$ is replaced for $(E-FJ^{-1}G)^{-1}$ in $M_1^{-1}$, giving our final expression for the inverse of the Jacobian and the analytical blocks, as shown below:

$$M_1^{-1} = \begin{bmatrix} M_2^{-1} & -M_2^{-1}FJ^{-1} \\ -J^{-1}GM_2^{-1} & J^{-1}+J^{-1}GM_2^{-1}FJ^{-1} \end{bmatrix} = \begin{bmatrix} B_1 & B_2 & B_3 \\ B_4 & B_5 & B_6 \\ B_7 & B_8 & B_9 \end{bmatrix}$$

By calculating the each element of $M_1^{-1}$, the following values for $B_1$-$B_9$ are acquired:

$B_1=L$ $B_2=-VA^TW$ $B_3=-LD_x^{-1}$ $B_4=-WAV$ $B_5=W$ $B_6=WAVD_x^{-1}$ $B_7=-D_x^{-1}D_zL$ $B_8=D_x^{-1}D_z(VA^TW)$ $B_9=D_x^{-1}+D_x^{-1}(D_zL)D_x^{-1}$

Where $L=V+VA^TWAV$, $$V = \text{diag}(-g) - \frac{ww^T}{1-w^Tp},$$

$W=Q^{-1}$, and $Q=-AVA^T$

In this manner, the dimensions of V are (n, n) (e.g., because the number of entries in g depend on the number of entries in n), the dimensions for Q are (c, c) (e.g., $-A_{cxn}V_{nxn}A_{nxc}^T=Q_{cxc}$), the dimensions for W are (c, c), the dimensions for L are (n, n) (e.g., $V_{nxn}+V_{xnx}A_{nxc}^TW_{cxc}A_{cxn}V_{nxn}=L_{nxn}$), and the dimensions of $D_x$ and $D_z$ are (n, n). Since V is always multiplied by some vector, i, creating a new vector, a subroutine may be applied to determine the product of V and the vector without storing V into the example memory 212, as shown below:

$$Vd = -\left(\text{diag}(g) + \frac{ww^T}{1-w^Tp}\right)d$$

$$= -\left(\text{diag}(-g)d - \frac{w(w^Td)}{1-w^Tp}\right)$$

Where the first term may be expressed as element-product of two column vector, the product of $(w^Td)$ is a dot product of two vectors (e.g., creating a scalar), and the denominator is a scalar. Therefore, none of the calculations involve matrices whose dimensions are larger than (c, n). Additionally, the only inverse that needs to be calculated based on these results is $(Q^{-1})d$, which is small (e.g., (c, c)) and can be solved using standard optimizing software without taking the inverse.

At block 714, the weight determiner 214 multiplies the analytical blocks (e.g., B1-B9) to the residual vectors (e.g., $r_d$, $r_p$, $r_c$) representative of the example population 100 resulting in the predictor adjustments, as shown below:

$$\begin{bmatrix} d_x \\ d_y \\ d_z \end{bmatrix} = \begin{bmatrix} B_1 & B_2 & B_3 \\ B_4 & B_5 & B_6 \\ B_7 & B_8 & B_9 \end{bmatrix}\begin{bmatrix} r_d \\ r_p \\ r_c \end{bmatrix} = \begin{bmatrix} B_1r_d + B_2r_p + B_3r_c \\ B_4r_d + B_5r_p + B_6r_c \\ B_7r_d + B_8r_p + B_9r_c \end{bmatrix}$$

As previously described, determining the corrector adjustments (e.g., to adjust the predictor adjustments based on constraints) involves finding the inverse of a Jacobian matrix associated with a linear system based on the predictor adjustments, as shown below (block 716):

$$\begin{bmatrix} d'_x \\ d'_y \\ d'_z \end{bmatrix} = \begin{bmatrix} -H & A^T & I \\ A & 0 & 0 \\ D_z & 0 & D_x \end{bmatrix}^{-1}\begin{bmatrix} r_d \\ r_p \\ r_c - D_zd_x - D_xd_z \end{bmatrix}, \text{ where}$$

-continued $$\begin{bmatrix} -H & A^T & I \\ A & 0 & 0 \\ D_z & 0 & D_x \end{bmatrix}^{-1} = \begin{bmatrix} B_1 & B_2 & B_3 \\ B_4 & B_5 & B_6 \\ B_7 & B_8 & B_9 \end{bmatrix}$$

Where $B_1$-$B_9$ are analytical blocks used to calculate the corrector adjustments.

At block 718, the weight determiner 214 separates components of the Jacobian matrix into blocks, as shown below:

$$\begin{bmatrix} -H & A^T & I \\ A & 0 & 0 \\ D_z & 0 & D_x \end{bmatrix}^{-1} \rightarrow \begin{bmatrix} E & F \\ G & J \end{bmatrix}^{-1} = M_1^{-1}$$

In this example, $-H$, $A^T$, $A$, and $0$ become E, I and 0 become F, $D_Z$ and 0 become G, and $D_x$ becomes J. As shown above, the block representation of the Jacobian is represented by $M_1$.

At block 720, the example Jacobian (e.g., $M_1$) is inverted using block-wise inversion, as shown below:

$$M_1^{-1} = \begin{bmatrix} (E-FJ^{-1}G)^{-1} & (E-FJ^{-1}G)^{-1}FJ^{-1} \\ -J^{-1}G(E-FJ^{-1}G)^{-1} & J^{-1}+J^{-1}G(E-FJ^{-1}G)^{-1}FJ^{-1} \end{bmatrix}$$

Since E is a matrix including the Hessian matrix H, E may be further broken up to reduce the dimensions of E. In this example, each component of $M_1^{-1}$ contains $(E-FJ^{-1}G)^{-1}$, therefore $(E-FJ^{-1}G)^{-1}$ may be separated into blocks in a similar fashion to block 718. At block 722, each element of $(E-FJ^{-1}G)^{-1}$ is separated into blocks as shown below:

$$(E-FJ^{-1}G)^{-1} = \begin{bmatrix} -(H+D_y) & A^T \\ A & 0 \end{bmatrix}^{-1} \rightarrow \begin{bmatrix} E_2 & F_2 \\ G_2 & J_2 \end{bmatrix}^{-1} = M_2^{-1}$$

Where the separation of $(E-FJ^{-1}G)^{-1}$ is labeled as $M_2^{-1}$.

At block 724, $M_2^{-1}$ is inverted using block-wise inversion, as shown below:

$$M_2^{-1} = \begin{bmatrix} E_2^{-1}+E_2^{-1}F_2WG_2E_2^{-1} & -E_2^{-1}F_2W \\ -WG_2E_2^{-1} & W \end{bmatrix}$$

where $W=(J_2-G_2E_2^{-1}F_2)^{-1}$, $F_2=A^T$, $G_2=A$.

In this example $E_2$ is the only component containing the Hessian matrix (e.g., $E_2=-(H+D_y)$). Since H is defined as $\text{diag}(p)-pp^T$, where $$p = \frac{n}{N}$$

and n represents frequency counts and N represents the total sum of the frequency counts, then $H+D_y=[\text{diag}(p)-pp^T]+[\text{diag}(y)] \rightarrow \text{diag}(p+y)-pp^T$. Therefore, by using Sherman-Morrison formula, the inverse of $H+D_y$ is calculated without computing the large Hessian H resulting in an expression for $E_2$ whose dimensions (e.g., [n, 1]) are smaller than a threshold size (e.g., [c, n]) (e.g., the size of the constraint matrix) (block 726), as shown below:

$$E_2^{-1} = -(H+D_Y)^{-1} = \text{diag}(-g) - \frac{ww^T}{1-w^Tp}, \text{ where}$$

$$w = pg, g = \frac{1}{p+y}, \text{ and } y = \frac{z}{x}$$

Once the reduced expression for $E_2$ is calculated, it is substituted for $E_2$ (block 728). At block 730, $M_2^{-1}$ is replaced for $(E-FJ^{-1}G)^{-1}$ in $M_1^{-1}$, giving our final expression for the inverse of the Jacobian and the analytical, as shown below:

$$M_1^{-1} = \begin{bmatrix} M_2^{-1} & -M_2^{-1}FJ^{-1} \\ -J^{-1}GM_2^{-1} & J^{-1}+J^{-1}GM_2^{-1}FJ^{-1} \end{bmatrix} = \begin{bmatrix} B_1 & B_2 & B_3 \\ B_4 & B_5 & B_6 \\ B_7 & B_8 & B_9 \end{bmatrix}$$

By calculating the each element of $M_1^{-1}$, the following values for $B_1$-$B_9$ are acquired:

$B_1 = L$ $B_2 = -VA^TW$ $B_3 = -LD_x^{-1}$ $B_4 = -WAV$ $B_5 = W$ $B_6 = WAVD_x^{-1}$ $B_7 = -D_x^{-1}D_zL$ $B_8 = D_x^{-1}D_z(VA^TW)$ $B_9 = D_x^{-1} + D_x^{-1}(D_z^{-1})D_x^{-1}$

Where $L = V + VA^TWAV$, $$V = \text{diag}(-g) - \frac{ww^T}{1-w^Tp},$$

$W = Q^{-1}$, and $Q = -AVA^T$

In this manner, the dimensions of V are (n, n) (e.g., because the number of entries in g depend on the number of entries in n), the dimensions for Q are (c, c) (e.g., $-A_{cxn}V_{nxn}A_{nxc}^T = Q_{cxc}$), the dimensions for W are (c, c), the dimensions for L are (n, n) (e.g., $V_{nxn} + V_{xnx}A_{nxc}^TW_{cxc}A_{cxn}V_{nxn} = L_{nxn}$), and the dimensions of $D_x$ and $D_z$ are (n, n). Since V is always multiplied by some vector, i, creating a new vector, a subroutine may be applied to determine the product of V and the vector without storing V into the example memory 212, as shown below:

$$Vd = -\left(\text{diag}(g) + \frac{ww^T}{1-w^Tp}\right)d$$

$$= -\left(\text{diag}(-g)d - \frac{w(w^T d)}{1 - w^T p}\right)$$

Where the first term may be expressed as element-product of two column vector, the product of $(w^T d)$ is a dot product of two vectors (e.g., creating a scalar), and the denominator is a scalar. Therefore, none of the calculations involve matrices whose dimensions are larger than $(c, n)$. Additionally, the only inverse that needs to be calculated based on these results is $(Q^{-1})d$, which is small (e.g., $(c, c)$) and can be solved using standard optimizing software without taking the inverse.

At block 732, the weight determiner 214 multiplies the analytical blocks (e.g., B1-B9) to the residual vectors (e.g., $r_d, r_p, r_c - D_z d_x - D_x d_z$) representative of the example population 100 resulting in the predictor adjustments, as shown below:

$$\begin{bmatrix} d_x \\ d_y \\ d_z \end{bmatrix} = \begin{bmatrix} B_1 & B_2 & B_3 \\ B_4 & B_5 & B_6 \\ B_7 & B_8 & B_9 \end{bmatrix} \begin{bmatrix} r_d \\ r_p \\ r_c - D_z d_x - D_x d_z \end{bmatrix} =$$

$$\begin{bmatrix} B_1 r_d + B_2 r_p + B_3 r_c - D_z d_x - D_x d_z \\ B_4 r_d + B_5 r_p + B_6 r_c - D_z d_x - D_x d_z \\ B_7 r_d + B_8 r_p + B_9 r_c - D_z d_x - D_x d_z \end{bmatrix}$$

The solution to the corrector linear equation is a set of adjustments that are applied to the arbitrary set of weights, as previously described in FIG. 6. In this manner, there is no need to calculate or store any matrix whose dimensions are larger than the constraint matrix and/or the example constrained population matrix. The result is a set of adjustments that slightly minimizes variance that is memory efficient and scalable. As previously described in FIG. 6, the process of FIGS. 7A and 7B is repeated multiple times until the arbitrary set of weights converges to the optimal set of weights.

While the example manners describe a particular technique to find set of optimal weights based on the equality constraint and the non-negative constraint, the technique may be used for linear systems accommodating any set of constraints. For example, if the predictor linear system includes an upper and lower bound constraint, the linear system will be slightly different, but the technique will be the same. In the upper and lower bound example, the analytical blocks may be determined based on the following predictor linear system:

$$\begin{bmatrix} d_x \\ d_y \\ d_{z1} \\ d_{z2} \end{bmatrix} = \begin{bmatrix} -H & A^T & I & -I \\ A & 0 & 0 & 0 \\ I & 0 & D_{szL} & 0 \\ -I & 0 & 0 & D_{szU} \end{bmatrix}^{-1} \begin{bmatrix} r_d \\ r_p \\ r_{cz1} \\ r_{cz2} \end{bmatrix} \rightarrow \begin{bmatrix} -H & A^T & I & -I \\ A & 0 & 0 & 0 \\ I & 0 & D_{szL} & 0 \\ -I & 0 & 0 & D_{szU} \end{bmatrix}^{-1} =$$

$$\begin{bmatrix} B_{11} & B_{12} & B_{13} & B_{14} \\ B_{21} & B_{22} & B_{23} & B_{24} \\ B_{31} & B_{32} & B_{33} & B_{34} \\ B_{41} & B_{42} & B_{43} & B_{44} \end{bmatrix}$$

In this manner, the example Jacobian will be broken up into the following blocks:

$$\begin{bmatrix} -H & A^T & I & -I \\ A & 0 & 0 & 0 \\ I & 0 & D_{szL} & 0 \\ -I & 0 & 0 & D_{szU} \end{bmatrix}^{-1} = \begin{bmatrix} E & F \\ G & J \end{bmatrix}^{-1} = M_I^{-1}$$

At this point, the steps of FIGS. 7A and 7B may be followed to obtain the following set of analytical values for $B_{11}$-$B_{44}$:

$B_{11} = L$ $B_{12} = -VA^T W$ $B_{13} = -LD_{sz1}^{-1}$ $B_{14} = LD_{sz2}^{-1}$ $B_{21} = -WAV$ $B_{22} = W$ $B_{23} = WAVD_{sz1}^{-1}$ $B_{24} = -WAVD_{sz2}^{-1}$ $B_{31} = -D_{sz1}^{-1}L$ $B_{32} = D_{sz1}^{-1}(VA^T W)$ $B_{33} = D_{sz1}^{-1} + D_{sz1}^{-1} L D_{sz1}^{-1}$ $B_{34} = -D_{sz1}^{-1} L D_{sz2}^{-1}$ $B_{41} = D_{sz2}^{-1} L$ $B_{42} = -D_{sz2}^{-1}(VA^T W)$ $B_{43} = -D_{sz2}^{-1} L D_{sz1}^{-1}$ $B_{44} = D_{sz2}^{-1} + D_{sz2}^{-1} L D_{sz2}^{-1}$

Where $L = V + VA^T WAV$, $$V = \text{diag}(-g) - \frac{ww^T}{1 - w^T p},$$

$W = Q^{-1}$, $Q = -AVA^T$, $D_{sz1} = \text{diag}(sz1)$, $D_{sz2} = \text{diag}(sz2)$, $$sz1 = \frac{s_{1,i}}{z_{1,i}}, \quad sz2 = \frac{s_{2,i}}{z_{2,i}}, \quad y_i = \frac{1}{sz1_i} + \frac{1}{sz2_i}, \quad g_i = \frac{1}{p_i + y_i},$$

and $w_i = p_i g_i$. In some examples, a corrector linear solution may be constructed for the bounded problem in a similar manner.

Figure 8:
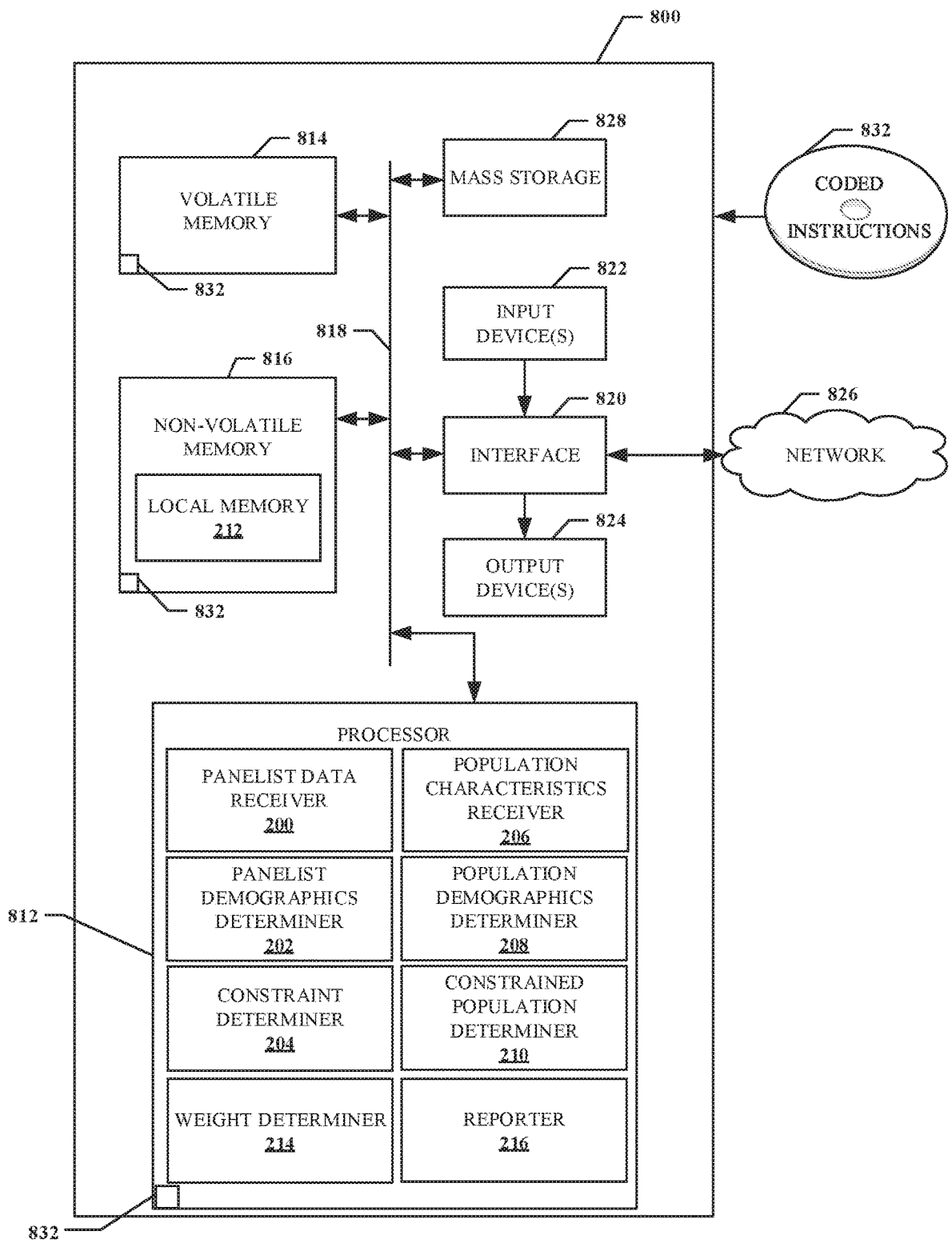
FIG. 8 is a block diagram of an example processor platform that may be utilized to execute the example instructions of FIGS. 4-6 to implement the sample calibrator of FIG. 1 and/or FIG. 2.

FIG. 8 is a block diagram of an example processor platform 800 capable of executing the instructions of FIGS. 5-7B to implement the example memory controller 202 of FIG. 2. The processor platform 800 can be, for example, a server, a personal computer, a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by integrated circuits, logic circuits, microprocessors or controllers from any desired family or manufacturer.

The processor 812 of the illustrated example includes the example memory 212 (e.g., a cache). The example processor 812 of FIG. 8 executes the instructions of FIGS. 5-7B to implement the example panelist data receiver 200, the example panelist demographics determiner 202, the example constraint determiner 204, the example population data receiver 206, the example populations demographics determiner 208, the example constrained population determiner 210, the example weight determiner 214, and the example reporter 216 of FIG. 2 to implement the example sample calibrator 112. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAIVIBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 5-7B may be stored in the mass storage device 828, in the volatile memory 814, in the non-volatile memory 816, and/or on a removable tangible computer readable storage medium such as a CD or DVD.

From the foregoing, it would be appreciated that the above disclosed methods, apparatus, and articles of manufacture determine a minimum variance solution for a constrained weight problem in a scalable and memory efficient manner. Using the examples disclosed herein, linear systems are used to adjust a set of weights to an optimal set of weights (e.g., whose variance is minimized) based on a set of constraints. In some examples, the optimal set of weights is a set of weights that is unique, satisfies all constraints, and minimizes variance. In some examples, the linear systems are solved analytically so that a matrix whose dimensions are larger than the constraint matrix does not need to be calculated or stored into memory. In some examples, block-wise inversion and Sherman-Morrison formula are used to determine the optimal solution. In some example, the optimal set of weights is applied to a sample to represent a population.

Conventional techniques to solve a linear system are not scalable or memory efficient. In fact, there is not enough available memory to solve medium-to-large scale problems using conventional techniques. The methods, apparatus, and articles of manufacture disclosed herein eliminate the need to store a potentially large linear equation associated with the optimal weights by solving the predictor and corrector linear systems analytically to adjust a set of weights to a desired set of weights by minimizing variance such that the amount of memory required to solve the linear system is dramatically reduced. The methods, apparatus, and articles of manufacture provide a technical solution acquiring such weights that could previously not be acquired.

The methods, apparatus, and articles of manufacture disclosed herein are able to solve a technical problem associated with solving large-scaled panelist-to-total population problems on a computer. Since a sample panel usually include more than 10,000 panelists, determining a set of weights based on a large number of panelists is desirable. Conventional techniques, however, cannot be executed by modern computers due to lack of memory. The methods, apparatus, and articles of manufacture disclosed herein are able to determine weights for a large number of panelists without storing large matrices associated with conventional techniques. In this manner, weights for large panels may be determined to represent a population of users.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A non-transitory computer readable storage medium comprising instructions which, when executed, cause a machine to at least:

store a constraint matrix and a population matrix into a memory, the constraint matrix representing demographics associated with a plurality of panelists in a population, the population matrix representing second demographics of the population;

determine a linear system based on a set of constraints including the constraint matrix and the population matrix;

determine a solution to the linear system by determining an inverse of a first matrix of the linear system, the determination of the inverse including breaking down the first matrix into blocks, dimensions of the blocks being no larger than dimensions of the constraint matrix, the determination of the inverse including:

reducing the dimensions of a second element of a third matrix to a size less than or equal to the dimensions of the constraint matrix, the third matrix being an inversion of a second matrix, the second matrix being an inversion of the first matrix, the reduced second element being a third element;

storing the reduced third matrix in the memory;

replacing, in the stored third matrix, the second element with the third element in the second matrix; and replacing a first element of the second matrix with the second matrix; and output a resultant set of weights based on the solution, the resultant set of weights satisfying the set of constraints.

2. The computer readable storage medium of claim 1, wherein the linear system is a predictor linear system, the instructions to cause the machine to:

determine a first solution to the predictor linear system;

determine a corrector linear system based on the first solution;

solve the corrector linear system based on the set of constraints to determine an adjusted solution; and adjust an initial set of weights based on an inverse of a fourth matrix of the corrector linear system, wherein the resultant set of weights is further based on the adjusted initial set of weights.

3. The computer readable storage medium of claim 2, wherein the instructions cause the machine to calculate a second solution to the corrector linear system multiple times until the adjusted initial set of weight converges to the resultant set of weights, the multiple calculations based on prior solutions to the corrector linear system.

4. The computer readable storage medium of claim 1, wherein the instructions cause the machine to apply the resultant set of weights to data associated with the panelists.

5. The computer readable storage medium of claim 4, wherein the instructions cause the machine to apply the resultant set of weights by:

receiving a media exposure event from a panelist from the plurality of panelists with a weight from the set of weights; and crediting demographics of the panelist for the media exposure event based on the weight.

6. The computer readable storage medium of claim 1, wherein the resultant set of weights is an optimal solution to an equality constraint, the equality constraint being an equation including the constraint matrix, the population matrix, and the set of weights.

7. The computer readable storage medium of claim 6, wherein:

the set of constraints further includes at least one of a non-negative constraint, a bound constraint, and the equality constraint; and the optimal solution is a non-negative solution with minimum variance.

8. The computer readable storage medium of claim 1, wherein the instructions cause the machine to generate the inverse of the first matrix of the linear system by:

separating components of the first matrix into a first set of blocks;

inverting the first matrix using blockwise inversion to generate the second matrix;

separating the first element of the second matrix into a second set of blocks; and inverting the second matrix using blockwise inversion to generate the third matrix, the second element of the third matrix having dimensions larger than the constraint matrix.

9. The computer readable storage medium of claim 8, wherein the instructions cause the machine to reduce the dimensions of the second element using Sherman-Morrison formula.

10. The computer readable storage medium of claim 9, wherein the instructions cause the machine to conserve the memory by eliminating a need to store the first linear system.

11. An apparatus for determining a plurality of weights for a plurality of panelists representative of a population, the apparatus comprising:

memory to store a constraint matrix and a population matrix into a memory, the constraint matrix representing demographics associated with a plurality of panelists in a population, the population matrix representing second demographics of the population;

a weight determiner to:

determine a linear system based on a set of constraints including the constraint matrix and the population matrix;

determine a solution to the linear system by determining an inverse of a first matrix of the linear system, the determination of the inverse including breaking down the first matrix into blocks, dimensions of the blocks being no larger than dimensions of the constraint matrix, the weight determiner to determine the inverse by:

reducing the dimensions of a second element of a third matrix to a size less than or equal to the dimensions of the constraint matrix, the third matrix being an inversion of a second matrix, the second matrix being an inversion of the first matrix, the reduced second element being a third element;

storing the reduced third matrix in the memory;

replacing, in the stored third matrix, the second element with the third element in the second matrix; and replacing a first element of the second matrix with the second matrix; and output a resultant set of weights based on the solution, the resultant set of weights satisfying the set of constraints.

12. The apparatus of claim 11, wherein the linear system is a predictor linear system, the weight determiner to:

determine a first solution to the predictor linear system;

determine a corrector linear system based on the first solution;

solve the corrector linear system based on the set of constraints to determine an adjusted solution; and adjust an initial set of weights based on an inverse of a fourth matrix of the corrector linear system, wherein the resultant set of weights is further based on the adjusted initial set of weights.

13. The apparatus of claim 12, wherein a second solution to the corrector linear system is calculated multiple times until the adjusted initial set of weight converges to the resultant set of weights, the multiple calculations based on prior solutions to the corrector linear system.

14. The apparatus of claim 11, wherein the weight determiner is to apply the resultant set of weights to data associated with the panelists.

15. The apparatus of claim 14, wherein the weight determiner is to apply the resultant set of weights by:

receiving a media exposure event from a panelist from the plurality of panelists with a weight from the set of weights; and crediting demographics of the panelist for the media exposure event based on the weight.

16. The apparatus of claim 11, wherein the resultant set of weights is an optimal solution to an equality constraint, the equality constraint being an equation including the constraint matrix, the population matrix, and the set of weights.

17. The apparatus of claim 16, wherein:
the set of constraints further includes at least one of a non-negative constraint, a bound constraint, and the equality constraint; and
the optimal solution is a non-negative solution with minimum variance.

18. The apparatus of claim 11, wherein the weight determiner is to determine the inverse of the first matrix of the linear system by:
separating components of the first matrix into a first set of blocks;
inverting the first matrix using blockwise inversion to generate the second matrix;
separating the first element of the second matrix into a second set of blocks; and
inverting the second matrix using blockwise inversion to generate the third matrix, the second element of the third matrix having dimensions larger than the constraint matrix.

19. The apparatus of claim 18, wherein the weight determiner is to reduce the dimensions of the second element using Sherman-Morrison formula.

20. A method for determining a plurality of weights for a plurality of panelists representative of a population, the method comprising:
storing a constraint matrix and a population matrix into a memory, the constraint matrix representing demographics associated with a plurality of panelists in a population, the population matrix representing second demographics of the population;
determining, by executing an instruction with a processor, a linear system based on a set of constraints including the constraint matrix and the population matrix;
determining, by executing an instruction with the processor, a solution to the linear system by determining an inverse of a first matrix of the linear system, the determination of the inverse including breaking down the first matrix into blocks, dimensions of the blocks being no larger than dimensions of the constraint matrix, the determination of the inverse including:
reducing the dimensions of a second element of a third matrix to a size less than or equal to the dimensions of the constraint matrix, the third matrix being an inversion of a second matrix, the second matrix being an inversion of the first matrix, the reduced second element being a third element;
storing the reduced third matrix in the memory;
replacing, in the stored third matrix, the second element with the third element in the second matrix; and
replacing a first element of the second matrix with the second matrix; and
outputting a resultant set of weights based on the solution, the resultant set of weights satisfying the set of constraints.

* * * * *